United States Patent
Zhu et al.

(10) Patent No.: US 10,651,734 B2
(45) Date of Patent: May 12, 2020

(54) SYSTEM AND METHOD FOR ROBUST BODY BRAKING CONTROL TO SUPPRESS TRANSIENT VOLTAGE OVERSHOOT

(71) Applicant: DELL PRODUCTS, LP, Round Rock, TX (US)

(72) Inventors: Guangyong Zhu, Austin, TX (US); Mehran Mirjafari, Austin, TX (US); Ralph Johnson, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 15/484,745

(22) Filed: Apr. 11, 2017

(65) Prior Publication Data

US 2018/0294720 A1  Oct. 11, 2018

(51) Int. Cl.
| | |
|---|---|
| *H02M 3/158* | (2006.01) |
| *H02M 1/32* | (2007.01) |
| *G01K 13/00* | (2006.01) |
| *G01K 3/00* | (2006.01) |

(52) U.S. Cl.
CPC .......... *H02M 3/158* (2013.01); *G01K 3/005* (2013.01); *G01K 13/00* (2013.01); *H02M 1/32* (2013.01); *H02M 3/1588* (2013.01); *H02M 2001/327* (2013.01)

(58) Field of Classification Search
CPC .. H02M 3/156; H02M 3/1588; H02M 3/1584; H02M 3/158; H02M 3/157; H02M 3/33507; H02M 3/1563; H02M 3/155; H02M 2001/0009; H02M 2001/0021; H02M 2001/0025; H02M 2001/0032; H02M 2001/327; H02M 1/32; Y02B 70/1466; G01K 13/00; G01K 3/005
USPC .................................................. 323/282–288
See application file for complete search history.

(56) References Cited

U.S. PATENT DOCUMENTS

| | | | |
|---|---|---|---|
| 6,753,723 B2 | 6/2004 | Zhang | |
| 7,436,162 B2 | 10/2008 | Walters | |
| 8,558,523 B2 | 10/2013 | Qiu et al. | |
| 8,917,074 B2 | 12/2014 | Luo et al. | |
| 2003/0178975 A1* | 9/2003 | Schuellein | H02M 3/1584 323/272 |

(Continued)

OTHER PUBLICATIONS

U.S. Appl. No. 15/461,137, filed Mar. 16, 2016.
U.S. Appl. No. 15/056,524, filed Feb. 29, 2016.

*Primary Examiner* — Gary L Laxton
*Assistant Examiner* — Kevin H Sprenger
(74) *Attorney, Agent, or Firm* — Larson Newman, LLP

(57) ABSTRACT

A voltage regulator includes power stages and a controller. The power stages are configured to provide power to a load in response to a pulse-width modulated (PWM) signal and to provide a body braking to the load in response to a body braking signal. The body braking is provided via a body diode of the power stage. The controller is configured to provide the PWM signals to a first power stage and a second power stage based upon a power demand of the load, to provide body braking signals to the first power stage and the second power stage in response to an over-voltage condition on the load, and to suspend the first body braking signal to the first power stage and maintain the second body braking signal to the second power stage, in response to an over-temperature condition on the first power stage.

18 Claims, 5 Drawing Sheets

(56) References Cited

U.S. PATENT DOCUMENTS

| | | | |
|---|---|---|---|
| 2004/0145845 A1* | 7/2004 | Schuellein | H02M 3/1584 |
| | | | 361/93.1 |
| 2007/0229049 A1* | 10/2007 | Zafarana | H02M 3/1584 |
| | | | 323/282 |
| 2008/0238982 A1 | 10/2008 | Cheung et al. | |
| 2009/0167271 A1 | 7/2009 | Tang et al. | |
| 2011/0241640 A1* | 10/2011 | Qiu | H02M 3/1584 |
| | | | 323/283 |

* cited by examiner

SYSTEM AND METHOD FOR ROBUST BODY BRAKING CONTROL TO SUPPRESS TRANSIENT VOLTAGE OVERSHOOT

FIELD OF THE DISCLOSURE

This disclosure generally relates to information handling systems, and more particularly relates to robust body braking control to suppress transient voltage overshoot.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A voltage regulator may include power stages and a controller. The power stages may be configured to provide power to a load in response to a pulse-width modulated (PWM) signal and to provide a body braking to the load in response to a body braking signal. The body braking may be provided via a body diode of the power stage. The controller may be configured to provide the PWM signals to a first power stage and a second power stage based upon a power demand of the load, to provide body braking signals to the first power stage and the second power stage in response to an over-voltage condition on the load, and to suspend the first body braking signal to the first power stage and maintain the second body braking signal to the second power stage, in response to an over-temperature condition on the first power stage.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
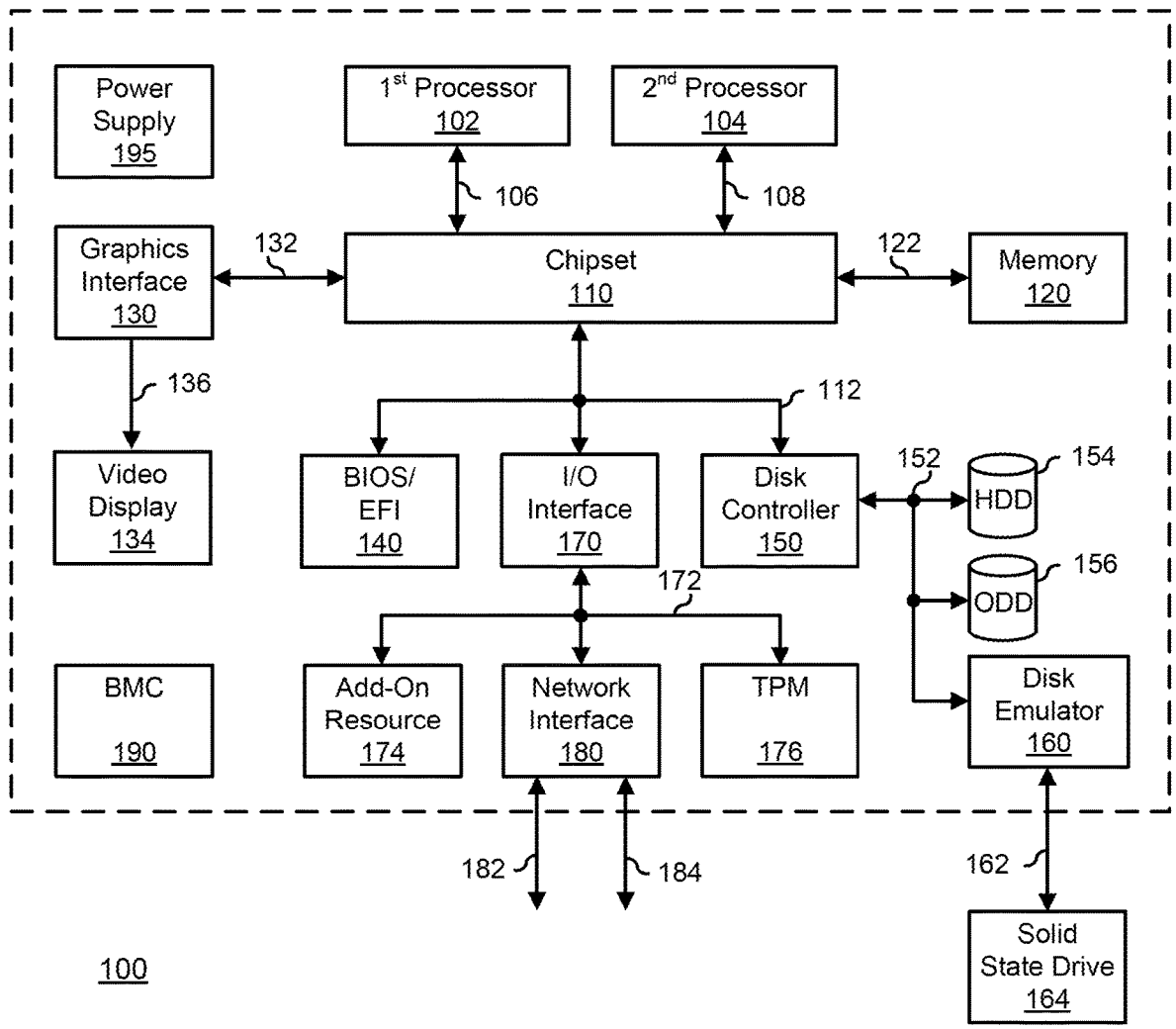
FIG. 1 is a block diagram illustrating a generalized information handling system according to an embodiment of the present disclosure.

FIG. 1 illustrates a generalized embodiment of an information handling system 100. For purpose of this disclosure information handling system 100 can be configured to provide the features and to perform the functions of the OPF system as described herein. Information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described below, and operates to perform one or more of the methods described below. Information handling system 100 includes a processors 102 and 104, a chipset 110, a memory 120, a graphics interface 130, a basic input and output system/extensible firmware interface (BIOS/EFI) module 140, a disk controller 150, a hard disk drive (HDD) 154, an optical disk drive (ODD) 156, a disk emulator 160 connected to an external solid state drive (SSD) 162, an input/output (I/O) interface 170, one or more add-on resources 174, a trusted platform module (TPM) 176, a network interface 180, a baseboard management controller (BMC) 190, and a power supply 195. Processors 102 and 104, chipset 110, memory 120, graphics interface 130, BIOS/EFI module 140, disk controller 150, HDD 154, ODD 156, disk emulator 160, SSD 162, I/O interface 170, add-on resources 174, TPM 176, and network interface 180 operate together to provide a host environment of information handling system 100, and BMC 190 provides a management environment for the information handling system.

In the host environment, processor 102 is connected to chipset 110 via processor interface 106, and processor 104 is connected to the chipset via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disk controller to HDD 154, to ODD 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

BMC 190 represents one or more processing devices, such as a dedicated BMC System-on-a-Chip (SoC) device, one or more associated memory devices, one or more network interface devices, and the like, that operate together to provide the management environment for information handling system 100. In particular, BMC 190 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 100, such as system cooling fans and power supplies. BMC 190 can include a network connection to an external management system, and the BMC can report status information for information handling system 100, receive BIOS/UEFI or system firmware updates, or other control information for managing and controlling the operation of the information handling system. BMC 190 can operate off of a separate power plane from the components of the host environment so that the BMC receives power to manage information handling system 100 when the information handling system is otherwise shut down. An example of BMC 190 includes a commercially available BMC product that operates in accordance with an Intelligent Platform Management Initiative (IPMI) specification, such as a Integrated Dell Remote Access Controller (iDRAC), or the like.

Power supply 195 represents one or more devices for power distribution to the components of information handling system 100. In particular, power supply 195 can include a main power supply that receives power from an input power source, such as a wall power outlet, a power strip, a battery, or another power source, as needed or desired. Here, power source 195 operates to convert the power at a first voltage level from the input power source to one or more power rails that are utilized by the components of information handling system. Power supply 195 can also include one or more voltage regulators (VRs) that each receive power from the main power supply and that operate to convert the input voltage to an output voltage that is used by one or more components of information handling system. For example, a VR can be provided for each of processors 102 and 104, and another VR can be provided for memory 120. Power supply 195 can be configured to provide a first power plane that provides power to the host environment, and to provide a second power plane that provides power to the management environment.

Figure 2:
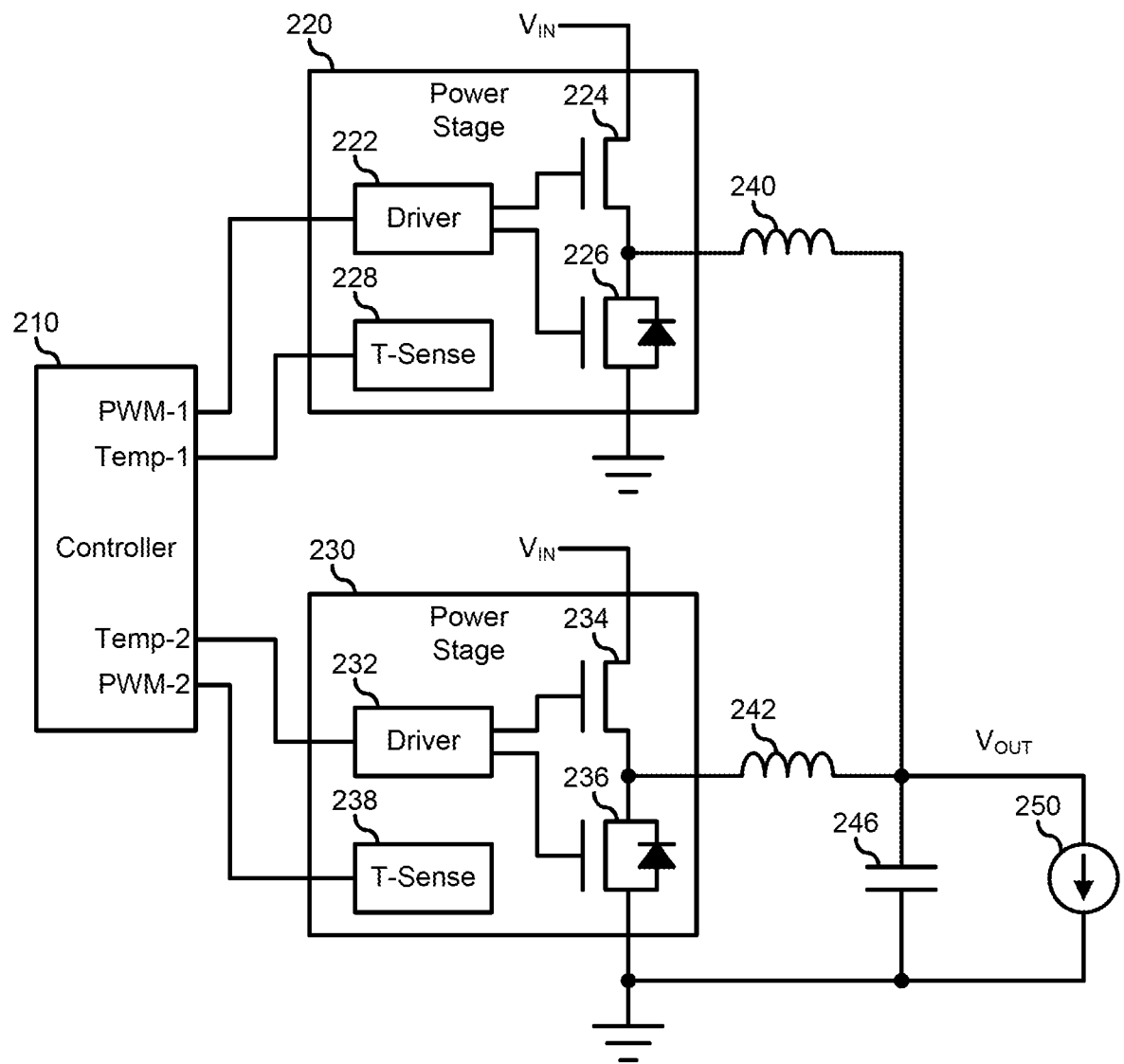
FIG. 2 is a block diagram illustrating a voltage regulator for an information handling system according to an embodiment of the present disclosure.

FIG. 2 illustrates a voltage regulator 200 for an information handling system such as for information handling system 100. Voltage regulator 200 includes a controller 210, a first power stage 220, a second power stage 230, voltage shaping elements including inductors 240 and 242, and capacitor 244, and a load 250. Voltage regulator 200 operates to receive an input voltage $V_{IN}$ at a first voltage level, and to convert the input voltage $V_{IN}$ to an output voltage $V_{OUT}$ at a second, lower voltage level. Load 250 is configured to receive the output voltage $V_{OUT}$ to perform a particular processing task. For example, load 250 can represent an information handling system or a particular portion of an information handling system, as needed or desired. Load 250 is characterized by the fact that the current drawn by the load varies based upon the needs of the processing task. For example, load 250 can draw a large current at a first time, based upon a large demand for the particular processing task, and can draw a small current at a second time, based upon a small demand for the particular processing task. In a particular example, voltage regulator 200 can represent a voltage regulator for a central processing unit (CPU), such as a 165 Watt, 187 Amp VR in accordance with an Intel VR13 Platform Design Guide, or in or another VR designed to provide a different peak power level in accordance with another design guide. In another example, voltage regulator 200 can represent a voltage regulator for one or more memory modules, such as DDR-3 or DDR-4 Dual In-Line Memory Modules (DIMMs). It will be understood that voltage regulator 200 can include one or more additional power stages similar to power stages 220 and 230, as needed or desired.

Power stage 220 includes driver logic 222, a high-side power device 224, a low side power device 226, and a temperature sensor 228. Driver 222 is connected to controller 210 to receive a pulse-width modulation (PWM) signal from the controller, and is connected to control inputs of high-side and low-side power devices 224 and 226 to alternately turn on and off the power devices, as described further, below. High-side power device 224 is connected to switch the input voltage $V_{IN}$ to an output of power stage 220. Low-side power device 226 is connected to switch the output of power stage 220 to a ground plane.

High-side and low-side power devices 222 and 224 represent switch devices, such as transistors, that are configured for providing power to the output of power stage 220. An example of power devices 222 and 224 include a power MOSFET, a JFET, an IGBT, a BJT, a thyristor, or another power device, as needed or desired. Temperature sensor 228 operates to detect the temperature at one or more location of power stage 220, and to provide a temperature sense signal to controller 210 that indicates the temperature at the one or more location of the power stage. For example, temperature sensor 228 can detect the temperature of one or more of high-side power device 224, low-side power device 226, and another location of power stage 220. Low-side power device 226 is configured to include a reverse-biased diode element between the ground plane and the output of power stage 220. The diode can represent a separate device of power stage 220, but is more typically representative of a diode device that is formed as a by-product of the design of low-side power device 226. As such, the diode is typically referred to as a body diode.

Driver logic 222 is configured to receive the PWM output from controller 210. The PWM output can issue one of three states, a high state, a low state, and an intermediate state between the high state and the low state, referred to as tri-state. When driver logic 222 detects that the PWM output is in the high state, the driver logic operates to turn on high-side power device 224 to connect the input voltage $V_{IN}$ to the output of power stage 220, and to turn off low-side power device 226 to isolate the output of the power stage from the ground plane. When driver logic 222 detects that the PWM output is in the low state, the driver logic operates to turn off high-side power device 224 to isolate the output of power stage 220 from the input voltage $V_{IN}$, and to turn on low-side power device 226 to connect the output of the power stage to the ground plane. When driver logic 222 detects that the PWM output is in the tri-state, the driver logic operates to turn off both high-side and low-side power devices 224 and 226 to isolate the output from both the input voltage $V_{IN}$ and the ground plane.

Power stage 230 is similar to power stage 220, and includes driver logic 232, a high-side power device 234, a low side power device 236, and a temperature sensor 238. Power stage 230 functions similarly to power stage 220, and is typically implemented as an identical electronic module or circuit of identical electronic components. Driver logic 232 receives a separate PWM signal from controller 210, and temperature sensor 238 provides a separate temperature sense signal to the controller from the temperature sense signal provided by temperature sensor 228.

Controller 210 operates to provide PWM signals to power stages 220 and 230 to provide an average voltage level at their respective outputs that is shaped by the voltage shaping elements into a smooth and steady output voltage $V_{OUT}$. As such, controller 210 includes output sensing logic, such as a voltage level detector at load 250 to detect a level of the output voltage $V_{OUT}$, a current detector to detect a load current, or the like. Based upon the information received by the output sensing logic, controller 210 varies the configuration of the PWM outputs to adapt the operation of power stages 220 and 230 to maintain the smooth and steady output voltage $V_{OUT}$. For example, when controller 210 detects a low power demand, such as by detecting a low load current, then the controller can provide PWM signals with a low duty cycle. That is, the PWM signals can be provided such that a portion of a switching cycle in which the PWM signal is in the high state can be short, with the PWM signal switching to the low state for the remainder of the switching cycle. In another example, when controller 210 detects a high power demand, such as by detecting a high load current, then the controller can provide PWM signals with a higher duty cycle. That is, the PWM signals can be provided such that a portion of the switching cycle in which the PWM signal is in the high state can be longer, again with the PWM signal switching to the low state for the remainder of the switching cycle. In a particular embodiment, the switching cycle is 2 microseconds (µs), giving a switching frequency of 500 kHz. The details of design and operation of a voltage regulator, such as voltage regulator 200, are known in the art, and will not be discussed further, except as needed to illustrate the present disclosure. Further, the skilled artisan will recognize that other schemes for providing power to a load can be utilized, and that the teachings of the present disclosure may be applied to other schemes, as needed or desired. For example, voltage regulator 200 can be configured to control the operation of power stages 220 and 230 based upon a pulse-frequency modulation (PFM), constant on-time (COT) scheme.

As load 250 switches between low demand operating states and high demand operating states, voltage regulator 200 operates to quickly adapt the operation of power stages to satisfy the increasing demand. In particular, capacitor 246 can be sized so as to provide power to load 250 in an interim between when the demand increases, and when power stages 220 and 230 can be directed to provide increased power based upon the received, higher duty cycle, PWM signals. On the other hand, as load 250 switches between high demand operating states and low demand operating states, voltage regulator 200 is faced with the challenge to suppress voltage overshoot at the load in the interim between when the demand decreases and when the power stages 220 and 230 can be directed to provide decreased power based upon the received, lower duty cycle, PWM signals. Moreover, such demand decreases may be sufficiently abrupt that providing a "zero" duty cycle PWM signal, that is, a PWM signal that is at the low state for the duration of the switching cycle, is not sufficient to suppress the voltage overshoot to below a particular over-voltage limit for load 250.

In the circumstances when the transition of the demand at load 250 from the high demand operating state to low demand operating state is more abrupt than can be managed by a zero duty cycle PWM signal, controller 210 provides the tri-state PWM output to power stages 220 and 230. In this state, power devices 224, 226, 234, and 236 are turned off, allowing the body diodes of the low-side power devices 226 and 236 to begin to conduct, providing alternate paths for the current in respective inductors 240 and 242 to flow. This mode is referred to as body braking. In operation, body braking results in increased heat generation in low-side power devices 226 and 236 because of power dissipation with the existence of a forward voltage drop (around 0.7 V) on the body diode when conducting current. Such heating can result in long-term reliability degradation or damage to power stages 220 and 230. As such typically, when one or the other of temperature sensors 228 or 238 detects an over temperature in the associated low-side power device 226 or 236, controller 210 halts body braking in both of power stages 220 and 230 to avoid damaging the power devices or otherwise operating in an over temperature situation. For example, when temperature sensor 228 detects an over temperature in low-side power device 226, the temperature sensor sends information to controller 210 indicating the temperature of the low-side power device is too high. The controller then operates to remove the tri-state in the PWM signal to driver logics 222 and 232, which effectively disables the body braking function in the regulator. Such a traditional approach, however, leaves overshoot suppression less effective, or more output decoupling capacitors have to be added thereby increasing the cost of the regulator.

Figure 3:
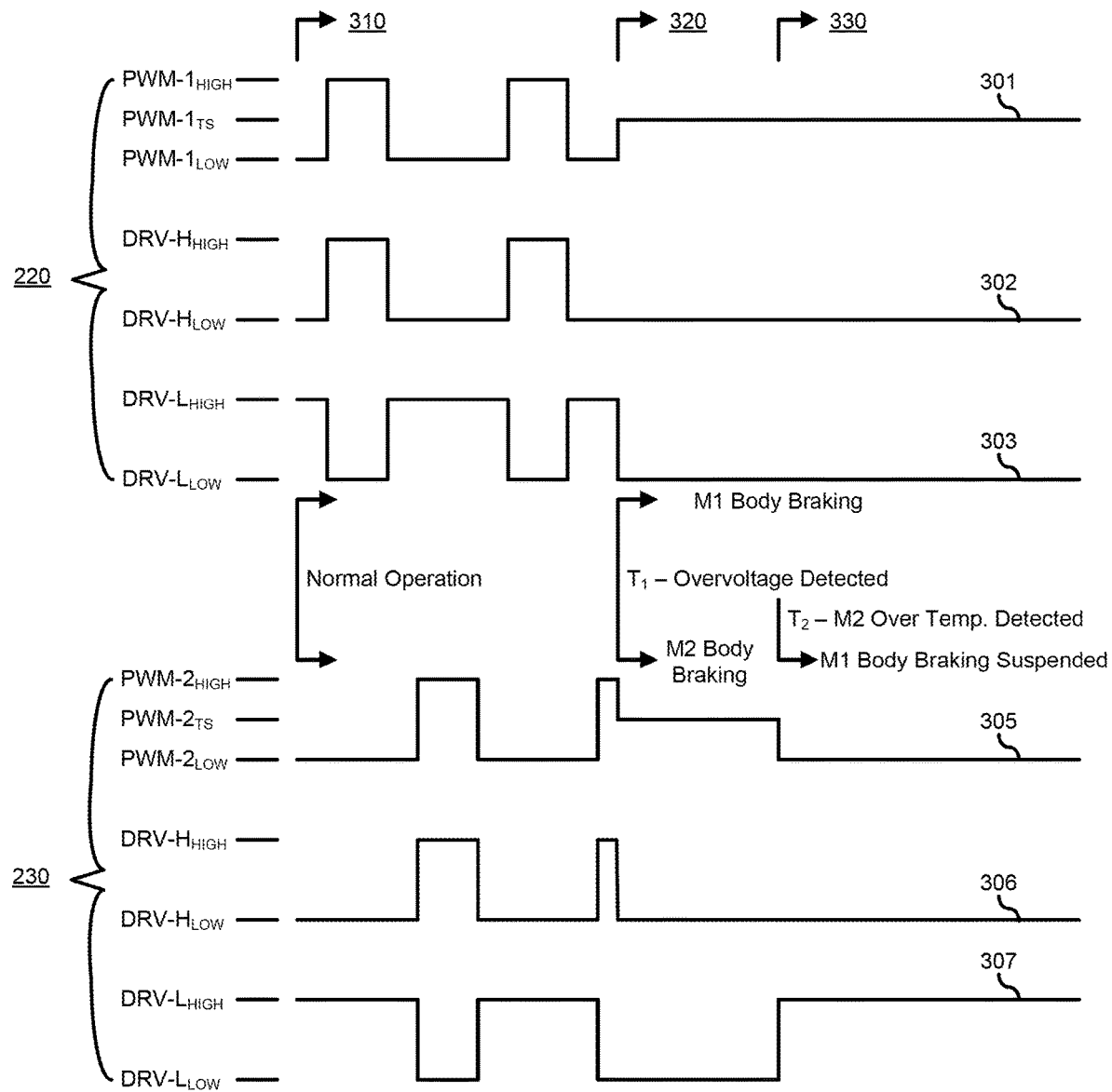
FIG. 3 illustrates the operation of the voltage regulator of FIG. 2.

In a particular embodiment, when one or the other of temperature sensors 228 or 238 detects an over temperature in the associated low-side power device 226 or 236, controller 210 halts body braking in only the power stages 220 or 230 that experienced the over temperature condition. FIG. 3 illustrates the operation 300 of voltage regulator 100 during normal operation 310, during body braking operations 320, and during over-temperature operations 330. In particular, power device 220 receives a PWM signal 301 from controller 210, and provides a high-side power device drive signal 302 and a low-side power device drive signal 303. Further, power device 230 receives a PWM signal 305 from controller 210, and provides a high-side power device drive signal 306 and a low-side power device drive signal 307.

During normal operation 310, PWM signals 301 and 305 are provided with a duty cycle that is determined by controller 110 based upon the power demanded by load 150. As illustrated, PWM signals 301 and 305 are provided with a 33% duty cycle. That is, PWM signals 301 and 305 are each in the high state for 33% of the switching cycle, and are each in the low state for the remaining 67% of the switching cycle. In response, when PWM signal 301 is in the high state, high-side power device drive signal 302 is in the high state and consequently high-side power device 224 is switched on, and low-side power device drive signal 303 is in the low state and consequently low-side power device 226 is switched off. Further, when PWM signal 301 is in the low state, high-side power device drive signal 302 is in the low state and consequently high-side power device 224 is switched off, and low-side power device drive signal 303 is in the high state and consequently low-side power device 226 is switched on. Similarly, when PWM signal 305 is in the high state, high-side power device drive signal 306 is in the high state and consequently high-side power device 234 is switched on, and low-side power device drive signal 307 is in the low state and consequently low-side power device 236 is switched off. Further, when PWM signal 305 is in the low state, high-side power device drive signal 306 is in the low state and consequently high-side power device 234 is switched off, and low-side power device drive signal 307 is in the high state and consequently low-side power device 236 is switched on.

Note that, as illustrated, PWM signal 305 is phase shifted by 180 degrees with respect to PWM signal 301. The skilled artisan will recognize that, where voltage regulator 200 includes three or more power stages, the PWM signals to each power stage is phase shifted in proportion to the number of power stages. For example, where voltage regulator 200 includes three power stages, the PWM signal to the second power stage can be shifted by 120 degrees with respect to the first power stage, and the PWM signal to the third power stage can be shifted by an additional 120 degrees with respect to the second power stage. In a particular embodiment, voltage regulator 200 is configured such that, during steady state operation, no two PWM signals are in the high state at the same time, and consequently, no two power stages are absorbing energy from the input power source $V_{IN}$ at the same time.

At a time T1, controller 210 detects an overvoltage following a load release transient from load 250 (i.e., a sudden load reduction), and the controller initiates body braking operations 320, targeted to suppress the overvoltage, where each of PWM signals 301 and 305 are driven to be in the tri-state, instead of being driven to the low state. In response, when PWM signal 301 is in the tri-state, both of high-side power device drive signal 302 and low-side power device drive signal 303 are in the low state, and consequently both high-side power device 224 and low-side power device 226 are switched off, and the body diode of the low-side power device begins to conduct, providing a freewheeling path for the current in inductor 240. Similarly, when PWM signal 305 is in the tri-state, both of high-side power device drive signal 306 and low-side power device drive signal 307 are in the low state, and consequently both high-side power device 234 and low-side power device 236 are switched off, and the body diode of the low-side power device begins to conduct, providing a freewheeling path for the current in inductor 242. As a consequence of the body braking, extra energy stored in inductors 240 and 242 is dissipated by low-side power devices 226 and 236, instead of transferring the energy to the output capacitors. As such, overshoot voltage can be reduced and less capacitance with capacitor 246 (and cost) is needed. After the transient event finishes, controller 210 resumes generating PWM signals 301 and 305 under normal operation conditions.

Enabling body braking may not always overheat the power devices of allowed limit. However, when load transients occur frequently, and body braking is enabled for a significant portion of the time, the power devices can overheat beyond the allowed limits. At time T2, power stage 230 becomes overheated, and temperature sensor 238 provides a temperature sense signal to controller 210, indicating that one or more location of the power stage has become overheated. In response, controller 210 initiates over-temperature operations 330. Here, PWM signal 301 is maintained in the tri-state and body braking remains enabled in power stage 220, but PWM signal 305 is reverted to the low state to disable body braking in power stage 230. As a result, the heat generation in the body diode of low side power device 236 is stopped and power stage 230 can cool down to a point where body braking can be resumed if needed. In a particular embodiment, when the temperature sense signal for a particular power stage indicates that the temperature exceeds 105 degrees Celsius, then controller 210 suspends body braking for that power stage. Further, when the temperature sense signal for that power stage indicates that the temperature has fallen below 100 degrees Celsius, then controller 210 resumes body braking for that power stage.

Note that, as illustrated in FIG. 3, once an overvoltage is detected, normal operation is suspended, and normal operation is not shown as being resumed. However, it will be understood that when the overvoltage is dissipated and the operating voltage falls back to within the normal operating voltage range, normal operation will be resumed, with the controller providing PWM signals to the drivers. Thus it will be understood that at some point in time after that shown in FIG. 3, normal operation is resumed. Similarly, as illustrated in FIG. 3, once an over-temperature condition is detected, body braking is not further reenabled, but this is not necessarily so, and, once the over-temperature condition is seen to have been addressed and the temperature is detected as being back within normal operating ranges, the controller can reenable body braking in the power module. Moreover, the situation may arise where different power modules are experiencing an over-temperature condition at different times, and so, particularly in a voltage regulator with multiple power phases, the switching into and out of body braking can be dynamically performed on the power phases to address the hot spot of the moment.

Figure 4:
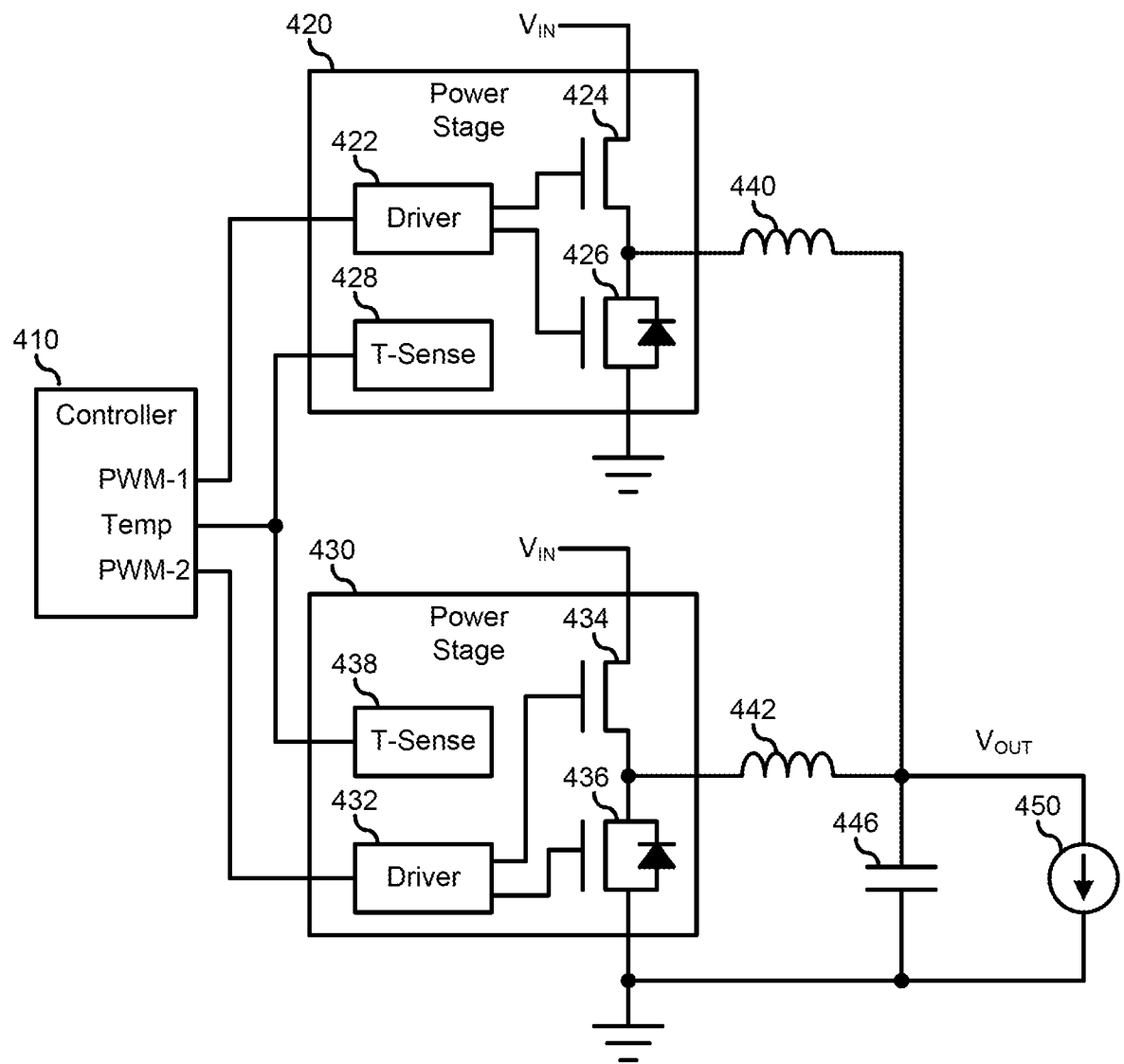
FIG. 4 is a block diagram illustrating a voltage regulator for an information handling system according to another embodiment of the present disclosure.

FIG. 4 illustrates a voltage regulator 400 similar to voltage regulator 200, and including a controller 410, a first power stage 420, a second power stage 430, voltage shaping elements including inductors 440 and 442, and capacitor 444, and a load 450. Power stage 420 includes driver logic 422, a high-side power device 424, a low side power device 426, and a temperature sensor 228. Driver 422 is connected to controller 410 to receive a pulse-width modulation (PWM) signal from the controller, and is connected to control inputs of high-side and low-side power devices 424 and 426 to alternately turn on and off the power devices. High-side power device 424 is connected to switch the input voltage $V_{IN}$ to an output of power stage 420. Low-side power device 426 is connected to switch the output of power stage 420 to a ground plane. Temperature sensor 428 operates to detect the temperature at one or more location of power stage 420, and to provide a temperature sense signal to controller 410 that indicates the temperature at the one or more location of the power stage. Driver logic 422 is configured to receive the PWM output from controller 410.

Power stage 430 is similar to power stage 420, and includes driver logic 432, a high-side power device 434, a low side power device 436, and a temperature sensor 438. Power stage 430 functions similarly to power stage 420, and is typically implemented as an identical electronic module or circuit of identical electronic components. Driver logic 432 receives a separate PWM signal from controller 410. However, the temperature sense signals lines from temperature sensor 428 and 438 are combined to provide a single shared monitor bus input to controller 410. Here, controller 410 is configured to distinguish the temperature sensor information received from temperature sensor 428 from the temperature sensor information received from temperature sensor 438. Then, in an overvoltage situation, when controller 410 detects that one or more of power stages 420 and 430 becomes overheated, based upon the received temperature sensor information, then the controller suspends the body braking operation only for the particular power stage that is overheated, as described above.

U.S. patent application Ser. No. 15/461,137, filed on Mar. 16, 2016, entitled "Individual Phase Temperature Monitoring and Balance Control for Smart Power Stage-Based Voltage Regulator," incorporated herein by reference, discloses embodiments of multi-phase voltage regulators that provide individual temperature sense signals to a controller from each of a plurality of smart power stages via a shared monitor bus. In each embodiment the multi-phase voltage regulators operate to distinguish the temperature sensor information for each smart power stage, even though all of the smart power stages provide their temperature sensor information via the shared monitor bus.

A first embodiment takes advantage of the fact that the PWM signals to each smart power stage are distributed across the switching cycle and do not overlap in steady state operation. In particular, each smart power stage is configured with a switched temperature sensor output, where the temperature sensor information for a particular smart power stage is only switched onto the shared monitor bus for a short duration of time, beginning at the rising edge of the PWM signal for that particular smart power stage. The controller then correlates the temperature sensor information received on the shared monitor bus at any particular time with the smart power stage that then has its PWM signal asserted.

A second embodiment provides a common shared signal to each smart power stage. The controller then selects a particular smart power stage from which the temperature sensor information is desired, and asserts the common shared signal concurrently with the PWM signal for the selected smart power stage for a predetermined number of switching cycles (such as, for three successive switching cycles). Each smart power stage is configured with a switched temperature sensor output and is further configured to determine that the common shared signal was asserted concurrently with its PWM signal for the predetermined number of cycles. Then, when a particular smart power stage determines that the common shared signal was asserted concurrently with its PWM signal for the predetermined number of cycles, the particular smart power stage switches its temperature sensor information onto the shared monitor bus.

Figure 5:
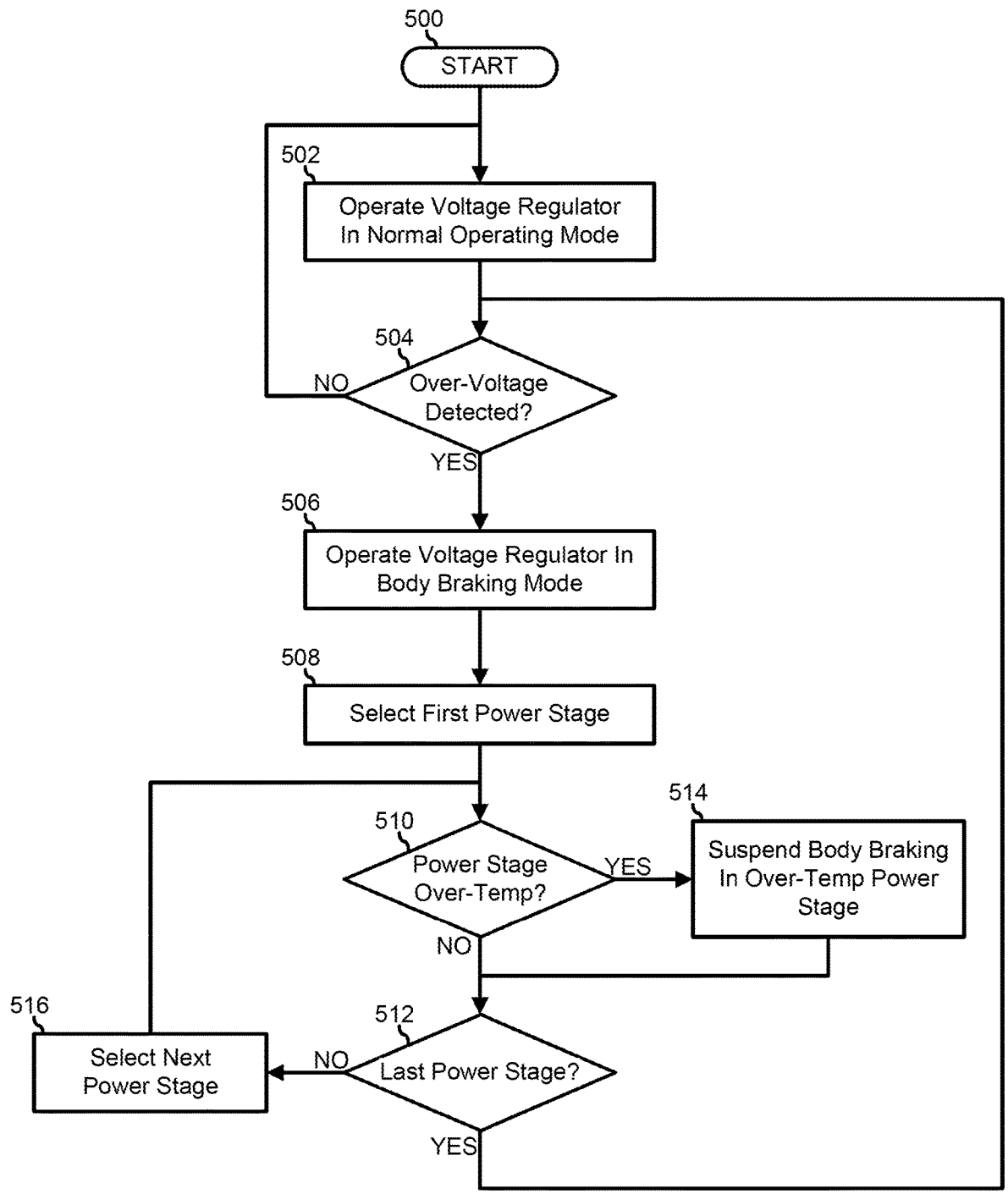
FIG. 5 is a flowchart illustrating a method for robust body braking control to suppress transient voltage overshoot in a voltage regulator according to an embodiment of the present disclosure.

FIG. 5 illustrates a method for robust body braking control to suppress transient voltage overshoot in a voltage regulator, starting at block 500. A voltage regulator is operated in a normal operating mode in block 502. For example, voltage regulator 200 can be operated such that the PWM signals to power stages 220 and 230 are provided in accordance with the duty cycle needed to provide the power to load 150. A decision is made as to whether or not an over-voltage at the load is detected in decision block 504. For example, controller 210 can be configured with or both of a voltage sensor to sense the output voltage, and a current sensor to sense the load current. If no over-voltage is detected at the load, the "NO" branch of decision block 504 is taken and the method returns to block 502 where the voltage regulator is operated in the normal operating mode.

If an over-voltage is detected at the load, the :YES" branch of decision block 504 is taken and the voltage regulator is operated in the body braking mode in block 506. For example, controller 210 can provide both of the PWM signals in the tri-state to turn off all of the power devices and to permit low-side power device 226 and 236 to dissipate the currents in respective inductors 140 and 142. A first power stage is selected in block 508 and a decision is made as to whether or not the selected power stage is indicating an over temperature condition in decision block 510. In a first example, each of power stages 220 and 230 can provide separate temperature sensor information signals to controller 210. Here, controller 210 can select a particular power stage by receiving the temperature sensor information from the selected power stage and can determine if the temperature sensor information indicates an over temperature condition for that power stage. In a second example, each of power stages 420 and 430 can provide their temperature sensor information signals on a shared monitor bus, and controller 410 can select a particular power stage and receive the temperature sensor information from the selected power stage on the shared monitor bus.

If the selected power stage is indicating an over temperature condition, as decided in decision block 510, the "YES" branch of the decision block is taken and the body braking operation in the over-temperature power stage is suspended in block 514, and the method proceeds to decision block 512, as described below. For example, when one of power stages 220 and 230 are determined to be over temperature, controller 210 can put provide the PWM signal to the over temperature power stage to the zero state, thereby turning on the low-side power device. If the selected power stage is not indicating an over temperature condition, the "NO" branch of decision block 510 is taken and the method proceeds to decision block 512 where a decision is made as to whether or not the selected power stage is the last power stage. If not, the "NO" branch of decision block 512 is taken, the next power stage is selected in block 516, and the method returns to decision block 510 where a decision is made as to whether or not the next power stage is indicating an over temperature condition. If the selected power stage is the last power stage, the "YES" branch of decision block 512 is taken and the method returns to decision block 504 where a decision is made as to whether or not an over-voltage at the load continues to be detected.

By suspending body braking in only an over-temperature power stage, rather than suspending body braking in all power stages in response to an over-temperature power stage, the voltage regulators of the present disclosure can more adaptably distribute the heat dissipation needs of the voltage regulator across the power stages, and can thereby enable more robust body braking in the voltage regulator than is provided by the typical voltage regulator. In addition, an information handling system that utilizes the voltage regulator of the present disclosure can be designed with fewer or smaller load capacitors, thereby reducing the footprint associated with the voltage regulator solution.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A voltage regulator, comprising:
a first power stage for a first phase of the voltage regulator, the first power stage including a first temperature sensor for the first phase, the first temperature sensor switched onto a shared bus to a controller, the first power stage configured to:
provide first power to a load in response to a first pulse-width modulated (PWM) signal;
switch first temperature information from the first temperature sensor onto the shared bus in response to a rising edge of the first PWM signal; and
provide a first body braking for the load in response to a first body braking signal, wherein the first body braking is provided via a first body diode of the first power stage;
a second power stage for a second phase of the voltage regulator, the second power stage including a second temperature sensor for the second phase, the second temperature sensor switched onto the shared bus to the controller, the second power stage configured to:
provide second power to the load in response to a second PWM signal;
switch second temperature information from the second temperature sensor onto the shared bus in response to a rising edge of the second PWM signal; and
provide a second body braking for the load in response to a second body braking signal, wherein the second body braking is provided via a second body diode of the second power stage; and
the controller configured to:

provide the first PWM signal to the first power stage and the second PWM signal to the second power stage based upon a power demand of the load;

provide the first body braking signal to the first power stage and the second body braking signal to the second power stage in response to an over-voltage condition on the load;

determine that an over-temperature indication is received while the first PWM signal is provided to the first power stage;

determine that the over-temperature indication is received from the first temperature sensor based upon determining that the over-temperature indication is received while the first PWM signal is provided; and suspend the first body braking signal to the first power stage and maintain the second body braking signal to the second power stage, in response to determining that the over-temperature indication was received from the first temperature sensor.

2. The voltage regulator of claim 1, wherein the controller is configured to:

receive the first temperature information from the shared bus, the first temperature information indicating the over-temperature condition; and determine that the first temperature information is from the first sensor.

3. The voltage regulator of claim 2, wherein:

the first temperature information is received at a time when the first PWM signal is in a high state; and the controller determines that the first temperature information is from the first sensor based upon the first temperature information being receive at the time.

4. The voltage regulator of claim 2, wherein:

the controller is further configured to provide a handshake signal to the first power stage;

the first temperature information is received in response to the controller providing the handshake signal; and the controller determines that the first temperature information is from the first sensor based upon the first temperature information being receive subsequent to the handshake signal.

5. The voltage regulator of claim 2, wherein the controller is further configured to:

receive the second temperature information from the shared bus, the second temperature information indicating the over-temperature condition has ended;

determine that the second temperature information is from the second sensor; and provide the first body braking signal to the first power in response to determining that the second temperature information is from the second sensor.

6. The voltage regulator of claim 1, wherein the first power stage includes a high-side power element and a low-side power element, the first body diode being integrated with the low-side power element.

7. The voltage regulator of claim 6, wherein:

in response to a high state of the first PWM signal, the high-side power element is turned on to provide power to the load and the low-side power element is turned off;

in response to a low state of the first PWM signal, the high-side power element is turned off to isolate the load from a power source and the low-side power element is turned on; and in response to the first body braking signal, the high-side power element and the low-side power element are turned off and the first body diode provides the first body braking.

8. The voltage regulator of claim 7, wherein the first power stage further comprises a driver configured to receive the first PWM signal and the first body braking signal from the controller.

9. A method, comprising:

providing, by a first power stage of a voltage regulator, first power to a load in response to a first pulse-width modulated (PWM) signal, the first power stage for a first phase of the voltage regulator;

switching, by a first temperature sensor of the first power stage, first temperature information from the first temperature sensor onto a shared bus in response to a rising edge of the first PWM signal;

providing a first body braking to the load in response to a first body braking signal, wherein the first body braking is provided via a first body diode of the first power stage;

providing, by a second power stage of the voltage regulator, second power to the load in response to a second PWM signal, the second power stage for a second phase of the voltage regulator;

switching, by a second temperature sensor of the second power stage, second temperature information from the second temperature sensor onto the shared bus in response to a rising edge of the second PWM signal;

providing a second body braking to the load in response to a second body braking signal, wherein the second body braking is provided via a second body diode of the second power stage;

providing, by a controller of the voltage regulator, the first PWM signal to the first power stage and the second PWM signal to the second power stage based upon a power demand of the load;

providing, by the controller, the first body braking signal to the first power stage and the second body braking signal to the second power stage in response to an over-voltage condition on the load;

receiving, via a shared bus, third temperature information;

determining that the third temperature information is received while the first PWM signal is provided to the first power stage;

determining that the third temperature information is the first temperature information based upon determining that the third temperature information is received while the first PWM signal is provided;

receiving, via the shared bus, the fourth temperature information; and determining that the fourth temperature information is received while the second PWM signal is provided to the second power stage;

determining that the fourth temperature information is the second temperature information based upon determining that the fourth temperature information is received while the second PWM signal is provided; and suspending, by the controller, the first body braking signal to the first power stage and not suspending the second body braking signal to the second power stage, in response to an over-temperature indication from the first temperature sensor.

10. The method of claim 9, further comprising:

receiving, by the controller, the first temperature information from the shared bus, the first temperature information indicating the over-temperature condition; and determining, by the controller, that the first temperature information is from the first sensor.

11. The method of claim 10, wherein:
the first temperature information is received at a time when the first PWM signal is in a high state; and
determining that the first temperature information is from the first sensor is based upon the first temperature information being receive at the time.

12. The method of claim 10, further comprising:
providing, by the controller, a handshake signal to the first power stage, wherein:
the first temperature information is received in response to the controller providing the handshake signal; and
determining that the first temperature information is from the first sensor is based upon the first temperature information being receive subsequent to the handshake signal.

13. The method of claim 10, further comprising:
receiving, by the controller, the second temperature information from the shared bus, the second temperature information indicating the over-temperature condition has ended;
determining, by the controller, that the second temperature information is from the second sensor; and
providing, by the controller, the first body braking signal to the first power in response to determining that the second temperature information is from the second sensor.

14. The method of claim 9, wherein the first power stage includes a high-side power element and a low-side power element, the first body diode being integrated with the low-side power element.

15. The method of claim 14, wherein:
turning on the high-side power element to provide power to the load and turning off the low-side power element in response to a high state of the first PWM signal;
turning off the high-side power element to isolate the load from a power source and turning on the low-side power element in response to a low state of the first PWM signal; and
turning off the high-side power element and the low-side power element and permitting the first body diode to provide the first body braking in response to the first body braking signal.

16. A voltage regulator, comprising:
a first power stage including a first control input, a second control input, a first power output, and a first temperature sensor output, the first power stage configured to:
provide power to the first load output in a first phase of the voltage regulator in response to a first pulse-width modulated (PWM) signal receive on the first control input;
determine that a control signal is received on the second control input concurrently with the receipt of the first PWM signal on the first control input;
provide first temperature information on the first temperature sensor output on the shared bus in response to determining that the control signal was received on the second input concurrently with the first PWM signal; and
provide a first body braking to the first load output in response to a first body braking signal received on the first control input, the first body braking being provided via a first body diode of the first power stage;
a second power stage including a third control input, a fourth control input, a second power output, and a second temperature sensor output, the second power stage configured to:
provide power to the second load output in a second phase of the voltage regulator in response to a second PWM signal receive on the third control input;
determine that the control signal is received on the fourth control input concurrently with the receipt of the second PWM signal on the third control input;
provide second temperature information on the second temperature sensor output on the shared bus in response to determining that the control signal was received on the fourth control input concurrently with the second PWM signal; and
provide a second body braking to the second load output in response to a second body braking signal received on the third control input, the second body braking being provided via a second body diode of the second power stage; and
a controller including a first control output coupled to the first control input, a second control output coupled to the third control input, a third control output coupled to the second and fourth control inputs, and a temperature sensor input coupled via a shared bus to the first temperature sensor output and the second temperature sensor output, the controller configured to:
provide the first PWM signal on the first control output and the second PWM signal on the second control output based upon a power demand of a load;
provide the first body braking signal on the first control output and the second body braking signal on the second control output in response to an over voltage condition on the load;
provide the control signal on the third control output concurrently with the provision of the first PWM signal on the first control output;
receive the first temperature information from the first temperature sensor output on the first temperature sensor input in response to an over temperature condition on the first power stage; and
suspend the first body braking signal to the first power stage and maintain the second body braking signal to the second power stage, in response to an over-temperature condition detected by the first temperature sensor.

17. The voltage regulator of claim 16, wherein the controller is configured to:
determine that the first temperature information is from the first sensor.

18. The voltage regulator of claim 16, wherein:
the first temperature information is received at a time when the first PWM signal is in a high state; and
the controller determines that the first temperature information is from the first sensor based upon the first temperature information being receive at the time.

* * * * *